United States Patent
Alano et al.

(10) Patent No.: US 9,719,397 B2
(45) Date of Patent: Aug. 1, 2017

(54) MIXER WITH INTEGRATED DOSER CONE

(71) Applicant: Faurecia Emissions Control Technologies, USA, LLC, Columbus, IN (US)

(72) Inventors: Eduardo Alano, Columbus, IN (US); Blake Lee McPeek, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 228 days.

(21) Appl. No.: 14/737,546

(22) Filed: Jun. 12, 2015

(65) Prior Publication Data
US 2016/0319723 A1  Nov. 3, 2016

Related U.S. Application Data

(60) Provisional application No. 62/155,025, filed on Apr. 30, 2015.

(51) Int. Cl.
*F01N 3/00* (2006.01)
*F01N 3/28* (2006.01)
(Continued)

(52) U.S. Cl.
CPC ........ *F01N 3/2892* (2013.01); *B01F 3/04049* (2013.01); *B01F 5/0473* (2013.01);
(Continued)

(58) Field of Classification Search
CPC .. B01F 5/0473; B01F 5/0614; F01N 2240/20; F01N 3/2892
(Continued)

(56) References Cited

U.S. PATENT DOCUMENTS

| 5,606,856 | A | 3/1997 | Linder |
| 6,539,708 | B1 | 4/2003 | Hofmann |

(Continued)

FOREIGN PATENT DOCUMENTS

| DE | 4417238 | 3/2003 |
| DE | 19806265 | 7/2004 |

(Continued)

OTHER PUBLICATIONS

International Search Report and Written Opinion for International Application No. PCT/US2016/028237 mailed Jul. 28, 2016.
(Continued)

*Primary Examiner* — Mark Laurenzi
*Assistant Examiner* — Anthony Ayala Delgado
(74) *Attorney, Agent, or Firm* — Barnes & Thornburg LLP (57) ABSTRACT

A mixer for a vehicle exhaust system includes an outer housing having an upstream end and a downstream end. An upstream baffle has an inlet opening configured to receive exhaust gas and is mounted at the upstream end of the outer housing. A downstream baffle has an outlet opening configured to conduct exhaust gases to a downstream exhaust component and is mounted at the downstream end of the outer housing. A doser opening is formed within the outer housing at a location between the upstream and downstream baffles. A cone has a narrow end with an inlet opening and a wide end with an outlet opening. A tapered body portion extends from the narrow end to the wide end, with the cone being aligned with the doser opening. An extension portion extends outwardly from the wide end of the cone and provides a wall that surrounds the outlet opening.

20 Claims, 7 Drawing Sheets

(51) Int. Cl.
 *F01N 3/20* (2006.01)
 *B01F 5/04* (2006.01)
 *B01F 5/06* (2006.01)
 *B01F 3/04* (2006.01)
(52) U.S. Cl.
 CPC .......... *B01F 5/0614* (2013.01); *F01N 3/2066* (2013.01); *F01N 2240/20* (2013.01); *F01N 2610/02* (2013.01)
(58) Field of Classification Search
 USPC .................................................. 60/295, 324
 See application file for complete search history.

(56) References Cited

U.S. PATENT DOCUMENTS

| | | | |
|---|---|---|---|
| 8,438,839 B2 | 5/2013 | Floyd | |
| 8,800,276 B2 | 8/2014 | Levin | |
| 9,057,312 B2* | 6/2015 | Munnannur | F01N 3/2892 |
| 9,180,407 B2 | 11/2015 | De Rudder | |
| 2003/0110763 A1 | 6/2003 | Pawson | |
| 2003/0226412 A1 | 12/2003 | Rumminger | |
| 2006/0070374 A1 | 4/2006 | Gaiser | |
| 2006/0218902 A1 | 10/2006 | Arellano | |
| 2007/0092413 A1 | 4/2007 | Hirata | |
| 2007/0163241 A1 | 7/2007 | Meingast | |
| 2007/0193252 A1 | 8/2007 | McKinley | |
| 2008/0011777 A1 | 1/2008 | Cooke | |
| 2008/0011780 A1 | 1/2008 | Cooke | |
| 2008/0022670 A1 | 1/2008 | Ichikawa | |
| 2008/0092526 A1 | 4/2008 | Kunkel | |
| 2008/0163612 A1 | 7/2008 | Gaiser | |
| 2008/0282687 A1 | 11/2008 | Park | |
| 2009/0044524 A1 | 2/2009 | Fujino | |
| 2009/0084094 A1 | 4/2009 | Goss | |
| 2009/0107126 A1 | 4/2009 | Bugos et al. | |
| 2009/0120066 A1 | 5/2009 | VanderGriend | |
| 2009/0127511 A1 | 5/2009 | Bruck | |
| 2010/0005790 A1 | 1/2010 | Zhang | |
| 2010/0071355 A1 | 3/2010 | Brown | |
| 2010/0101222 A1 | 4/2010 | Oesterle | |
| 2010/0186393 A1 | 7/2010 | Kowada | |
| 2010/0212292 A1 | 8/2010 | Rusch et al. | |
| 2011/0094206 A1 | 4/2011 | Liu et al. | |
| 2011/0107743 A1 | 5/2011 | Ranganathan | |
| 2012/0216513 A1 | 8/2012 | Greber et al. | |

FOREIGN PATENT DOCUMENTS

| | | |
|---|---|---|
| DE | 10312212 | 9/2006 |
| DE | 102005061145 | 6/2007 |
| DE | 202007010324 | 11/2008 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102008040476 | 4/2013 |
| DE | 10241697 | 5/2016 |
| EP | 0268026 | 8/1993 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2965011 | 3/2012 |
| FR | 2977632 | 1/2013 |
| JP | H2223624 | 2/1989 |
| JP | H0296212 | 4/1990 |
| JP | 2013002367 | 1/2013 |
| KR | 20110049152 A | 5/2011 |
| SE | 531199 | 1/2009 |
| WO | 9701387 | 1/1997 |
| WO | 2008027146 | 3/2008 |
| WO | 2008034981 | 3/2008 |
| WO | 2009068136 | 6/2009 |
| WO | 2010078052 | 7/2010 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099313 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 | 4/2014 |
| WO | 2014051617 A1 | 4/2014 |
| WO | 2014077023 | 5/2014 |
| WO | 2014112063 | 7/2014 |
| WO | 2014112067 | 7/2014 |
| WO | 2014112073 | 7/2014 |
| WO | 2014182832 | 11/2014 |
| WO | 2015018971 | 2/2015 |
| WO | 2015020820 | 2/2015 |
| WO | 2015074926 | 5/2015 |
| WO | 2015076765 | 5/2015 |
| WO | 2015130640 | 9/2015 |
| WO | 2015151282 | 10/2015 |
| WO | 2015187128 | 12/2015 |
| WO | 2016013319 | 1/2016 |
| WO | 2014112072 | 1/2017 |
| WO | 2014115461 | 1/2017 |

OTHER PUBLICATIONS

International Search Report for PCT International Application Serial No. PCT/US2016/058114, 16FECT013 PCT II, 9 pages.

Jean et al., New Concepts for the Urea Injection Area in SCR Exhaust Systems for Passenger Cars, Aachen Congress, p. 1373-2010, 2010, 18 pages.

Rusch et al., Urea SCR Interaction of Spray Generation and Exhaust System, 3rd International CTI Forum SCR-System, Bonn, Apr. 2008, 30 pages.

* cited by examiner

MIXER WITH INTEGRATED DOSER CONE

CROSS-REFERENCE TO RELATED APPLICATION

This application claims priority to U.S. Provisional Patent Application No. 62/155,025, filed Apr. 30, 2015.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

In one known configuration, the mixer includes an outer housing with an opening that receives the doser. A cone is aligned with this opening to provide a widening spray area into the internal cavity of the outer housing. The widening spray area facilitates a more thorough distribution of spray droplets over a larger area as the spray enters the exhaust gas stream.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. In configurations that utilize a cone, deposit initiation sites have been found on the wall of the cone. The deposits in these sites build up over time and can adversely affect system operation. For example, there may be a lower ammonia uniformity index, there may be an increased pressure drop across the mixer, or they may be a peak of ammonia emissions during active diesel particulate filter (DPF) regeneration.

SUMMARY OF THE INVENTION

In one exemplary embodiment, a mixer for a vehicle exhaust system includes an outer housing having an upstream end and a downstream end. An upstream baffle has an inlet opening configured to receive exhaust gas and is mounted at the upstream end of the outer housing. A downstream baffle has an outlet opening configured to conduct exhaust gases to a downstream exhaust component and is mounted at the downstream end of the outer housing. A doser opening is formed within the outer housing at a location between the upstream and downstream baffles. A cone has a narrow end with an inlet opening and a wide end with an outlet opening. A tapered body portion extends from the narrow end to the wide end, with the cone being aligned with the doser opening. An extension portion extends outwardly from the wide end of the cone and provides a wall that surrounds the outlet opening.

In a further embodiment of the above, the extension portion and the cone are integrally formed together as a single-piece component.

In a further embodiment of any of the above, a curved transition surface extends from an inner surface of the cone at the wide end to the extension portion.

In a further embodiment of any of the above, the extension portion further includes a wall portion overlapping an inner peripheral surface of the outer housing and a plate portion extending radially inwardly from the wall portion.

In another exemplary embodiment, a vehicle exhaust system comprises a mixer having an upstream baffle with at least one inlet opening configured to receive engine exhaust gas, a downstream baffle with at least one outlet opening configured to conduct engine exhaust gases to a downstream exhaust component, an outer peripheral wall surrounding the upstream and downstream baffles and defining a mixer central axis. A doser is configured to spray a reducing agent into the mixer, the doser defining a central doser axis and being mounted at a doser opening within the outer peripheral wall. A cone has a narrow end with an inlet opening and a wide end with an outlet opening. A tapered body portion extends from the narrow end to the wide end, the cone being aligned with the doser opening. An extension portion extends outwardly from the wide end of the cone to provide a wall that surrounds the outlet opening.

In a further embodiment of any of the above, the central doser axis does not intersect the central mixer axis.

These and other features of this application will be best understood from the following specification and drawings, the following of which is a brief description.

DETAILED DESCRIPTION

Figure 1:
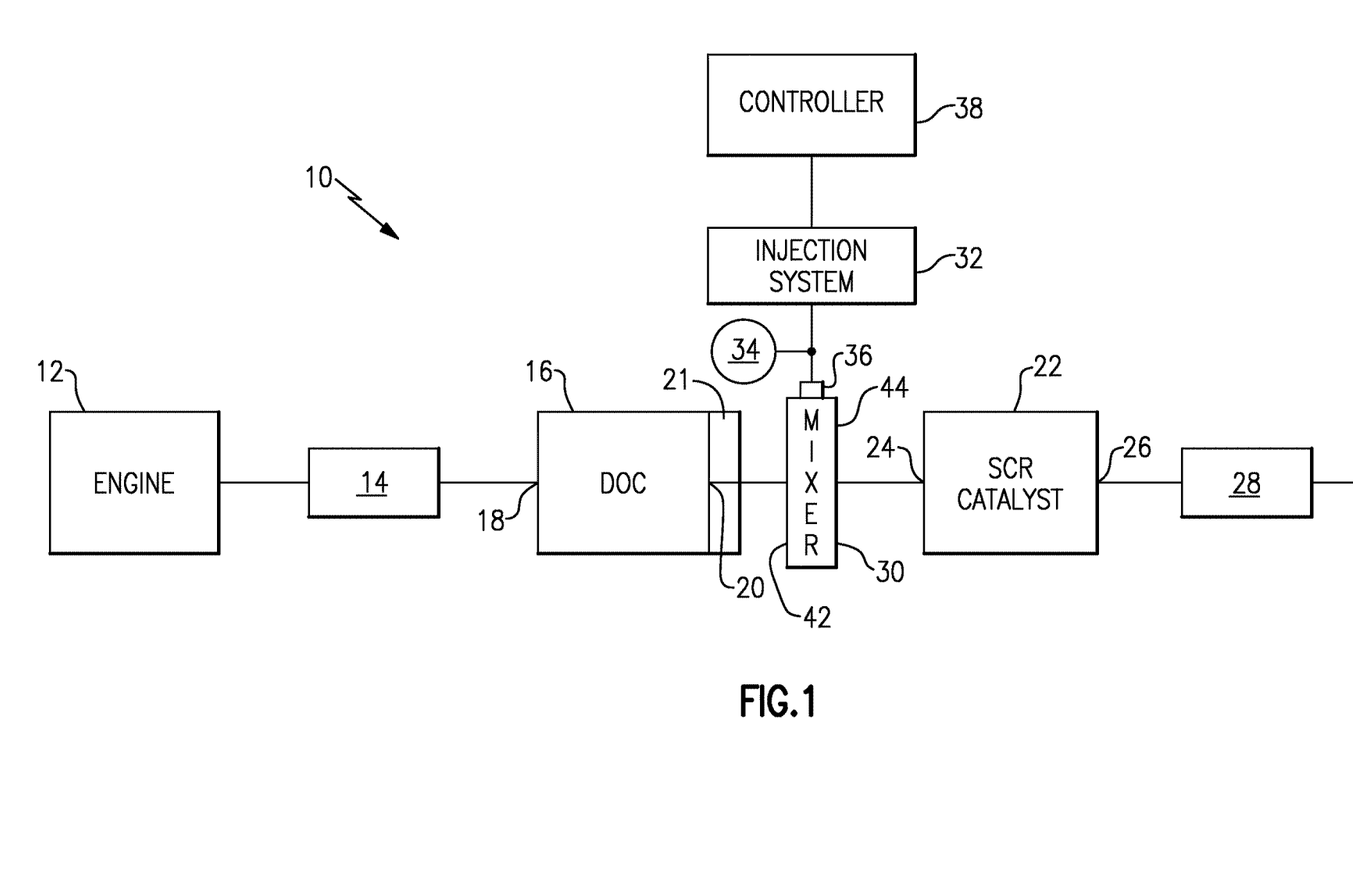
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. In one example, the component 21 may be the DPF and a subsequent portion of exhaust pipe with an optional elbow type connection. In another example, the component 21 may be a portion of exhaust pipe with an optional elbow type connection. Downstream of the DOC 16 and optional component 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

The mixer 30 is shown in greater detail in FIGS. 2-9. As shown in FIG. 2A, the mixer 30 comprises a mixer outer housing having an inlet end 42 configured to receive the engine exhaust gases and an outlet end 44 to direct a mixture of swirling engine exhaust gas and products transformed from urea to the SCR catalyst 22. Further, the mixer body includes an upstream baffle 50 (FIGS. 2A-2B) and a downstream baffle 52 (FIG. 3) that are surrounded by an outer peripheral wall 54. The upstream baffle 50 is configured to initiate swirling of the exhaust gas flow. The mixer 30 also includes an inner peripheral surface 56 (FIG. 5) that faces inwardly toward a mixer center axis A.

Figure 2A:
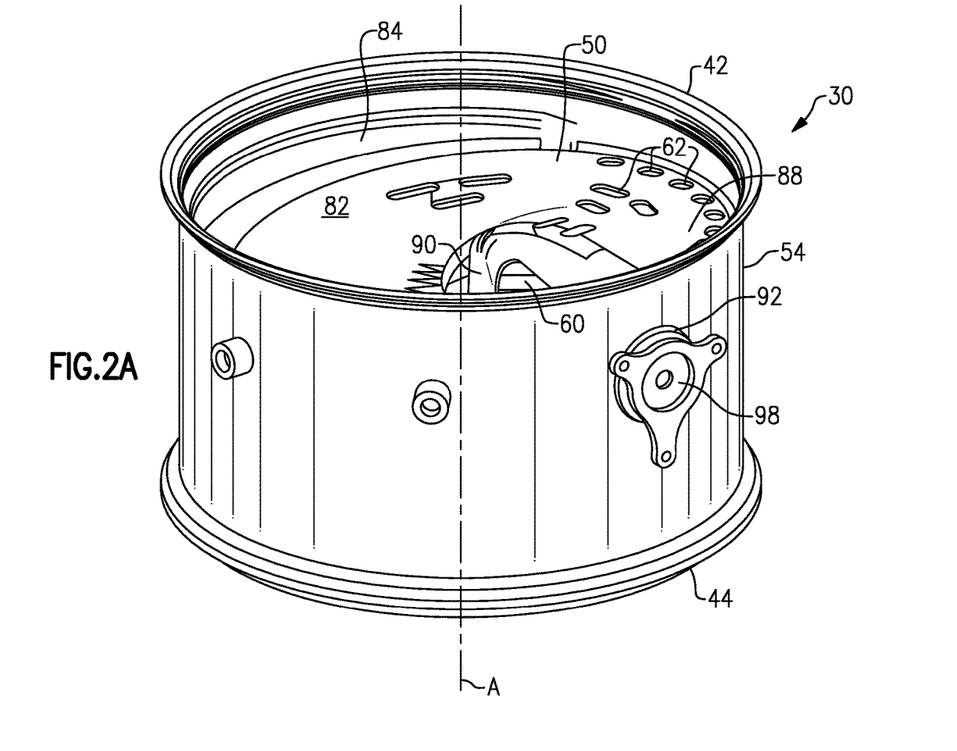
FIG. 2A is a perspective view of an upstream end of a mixer according to the subject invention.

The upstream baffle 50 at the inlet 42 may include a large inlet opening 60 that can receives the majority of the exhaust gas (for example, the large inlet opening 60 receives 60% of the exhaust mass flow rate), and which is configured to initiate the swirling motion. The upstream baffle 50 also includes a plurality of perforations, slots, or additional inlet openings 62 that ensure optimal homogenization of exhaust gases and reduces back pressure. The upstream baffle 50 and the plurality of inlet openings 60, 62 cooperate to initiate a swirling motion to the exhaust gas as the exhaust gas enters the inlet end 42 of the mixer 30.

The downstream baffle 52 includes a large outlet opening 64 (FIG. 9) through which the majority of the exhaust gas exits. The downstream baffle 52 also includes a plurality of additional outlet openings 66 surrounded by lips 68 through which the exhaust gas exits. The lips 68 keep the urea inside the mixer 30 in order to increase DEF transformation and improve mixing performance. The lips 68 also generate additional turbulence to further improve mixing performance. The downstream baffle 52 comprises a helical portion 70. An axis of the helix is the center axis of the mixer represented by A (FIG. 2) with a rim 72 formed about an outer perimeter of the helical portion 70. The rim 72 extends in an upstream direction.

The large outlet opening 64 comprises primary outlet opening and is larger than the other outlet openings 66. The helical portion 70 includes the additional outlet openings 66. The helical portion 70 is formed by an upstream end portion 74 and a downstream end portion 78. Portions 74 and 78 include flat surface portions perpendicular to the mixer axis A (FIG. 2A) with the helical portions extending therebetween. A wall 80 extends between the flat surface of the downstream end portion 78 and the flat surface of the upstream end portion 74, and the primary outlet opening 64 is formed within the wall 80.

Figure 2B:
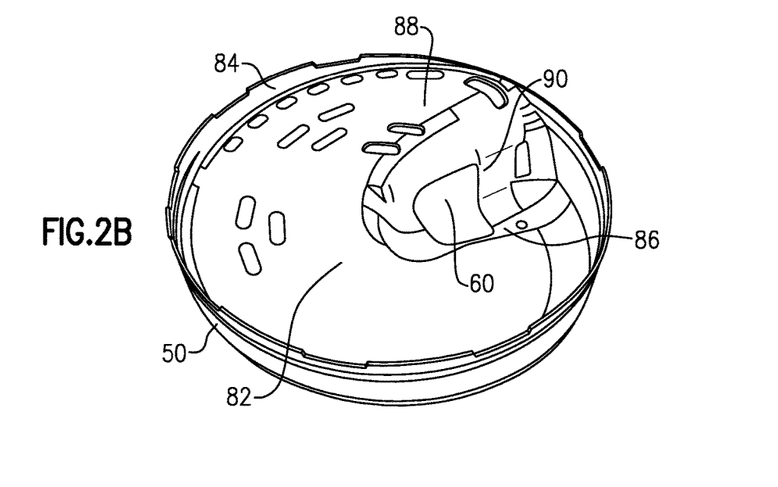
FIG. 2B is a perspective of an upstream baffle from FIG. 2A.
Figure 3:
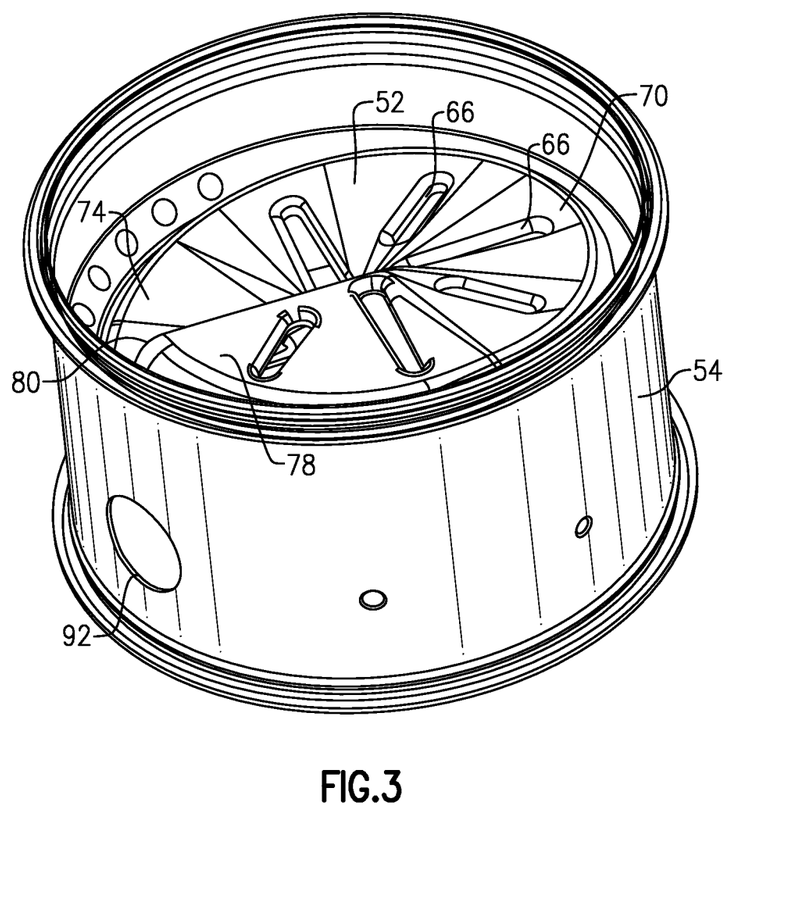
FIG. 3 is a perspective view of a downstream end of the mixer according to the subject invention.

Similarly, as shown in FIG. 2B, the upstream baffle 50 comprises a helical portion 82 with a rim 84 formed about an outer perimeter of the helical portion 82. The large inlet opening 60 comprises a primary inlet opening and may be larger than the other inlet openings 62. The helical portion 82 includes additional inlet openings 62 and has an upstream end portion 88 and a downstream end portion 86. A wall 90 extends from the upstream portion 88 to the downstream portion 86 and the primary inlet opening 60 is formed within the wall 90.

Figure 4A:
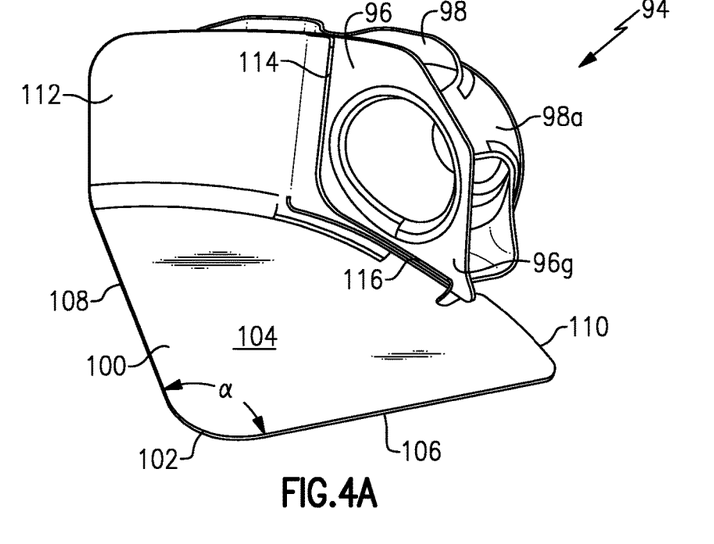
FIG. 4A is a perspective front view of a mixer sub-assembly including a cone, manifold, and intermediate plate.
Figure 4B:
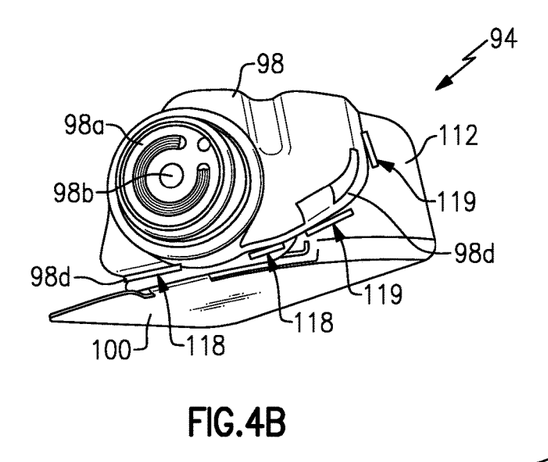
FIG. 4B is a perspective rear view of the sub-assembly of FIG. 4A.
Figure 4C:
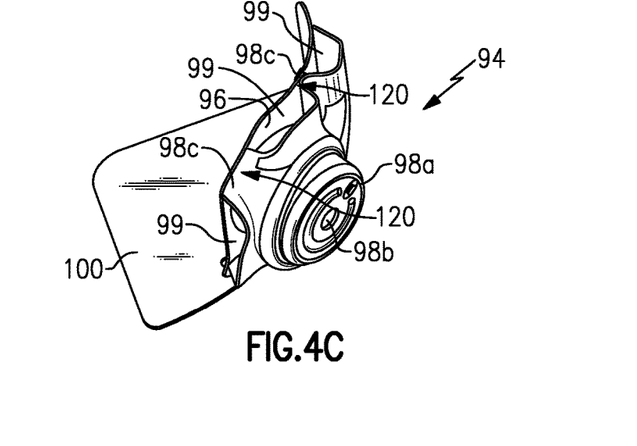
FIG. 4C is a perspective top view of the sub-assembly of FIG. 4A.

The outer peripheral wall 54 includes an opening 92 formed at a location between the upstream 50 and downstream 52 baffles. The opening 92 is configured to receive the doser 36. FIGS. 4A-4C show a sub-assembly 94 that is aligned with the opening 92 to facilitate mounting of the doser 36 to the mixer 30 such that spray is introduced into the exhaust gas stream in the desired orientation. The sub-assembly 94 includes a cone 96, a manifold 98, and an intermediate plate 100. The cone 96 has a narrow end 96a with an inlet opening 96b and a wide end 96c with an outlet opening 96d. A tapered body portion 96e extends from the narrow end 96a to the wide end 96c. An extension transition portion 96f extends from the wide end 96c of the cone 96 to provide a wall 96g that surrounds the outlet opening 96d. This extension transition portion 96f provides a smooth transition (as indicated at 96h in FIG. 6) between the tapered portion of the cone 96 and the wall 96g, which reduces deposit build-ups in this area.

As best shown in FIGS. 4B-4C, the manifold 98 includes an interface portion 98a with a doser opening 98b that is aligned with the opening 92 in the outer peripheral wall 54. Optionally one or more attachment arms 98c extend from the interface portion 98a in a direction toward the wall 96g of the cone 96. Optionally one or more flanges 98d extend from the interface portion 98a towards the wall 96g or the flange 112. Arms 98c and flanges 98d are disposed in a certain way to create one or more chambers 99. The exhaust flow goes through the chamber 99 and is directed to the inlet opening 96b. The inlet opening 96b of the cone 96 is aligned with the doser opening 98b such that the narrow end 96a of the cone 96 fits within the interface portion 98a of the manifold 98.

The intermediate plate 100 is attached to the manifold 98 and the cone 96 to form the sub-assembly 94. The intermediate plate 100 has an apex 102 near the mixer central axis A and which widens radially outward in a direction toward the outer peripheral wall 54. The intermediate plate 100 comprises a flat portion 104 defined by a first edge 106 extending radially outward from the apex 102, a second edge 108 extending radially outward from the apex 102 and circumferentially spaced from the first edge 106, and an outer peripheral edge 110 connecting the first 106 and second 108 edges to define a wedge-shape. The first edge 106 comprises an inlet side of the intermediate plate 100 and the second edge 108 comprises the outlet side of the intermediate plate 100. The angle defined by edge 106 and edge 108 can vary from 70 deg to 270 deg. The flat portion 104 can have an adjacent helical portion at the outlet side, which is the edge 108.

In one example, the intermediate plate 100 includes a flange portion 112 that extends in an upstream direction from the outer peripheral edge 110. The flange portion 112 does not extend along the entire outer peripheral edge 110. As shown in FIG. 4A, the wall 96g of the cone 96 can be attached to one edge of the flange portion 112 (as indicated at 114) and can be also attached along a portion of the outer peripheral edge 110 (as indicated at 116). As shown in FIGS. 4B-4C, the flange 98d of the manifold 98 is attached with weld(s) 118 to the wall portion 96g of the cone 96 and weld(s) 119 to the flange portion 112 of the intermediate plate 100. As shown in FIG. 4C, the arm portions 98c of the manifold 98 are attached to the wall portion 96g of the cone 96 with welds 120 to form the sub-assembly 94.

Figure 5:
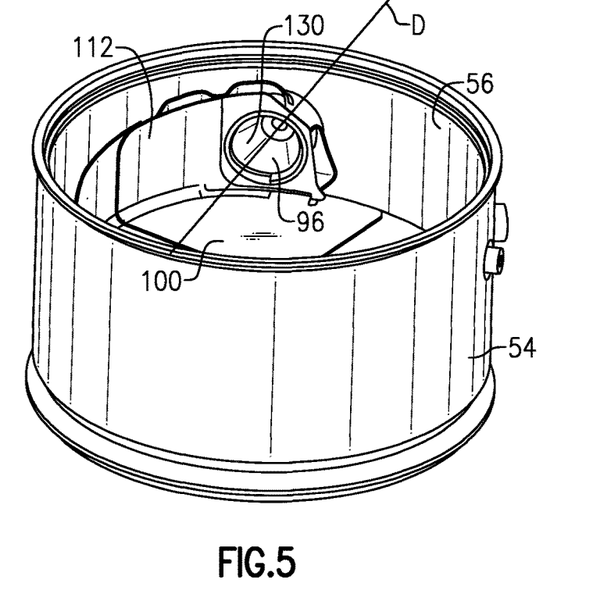
FIG. 5 is a perspective view of the sub-assembly of FIG. 4A included within the mixer.

The sub-assembly 94 is then placed within the mixer 30, as shown in FIG. 5, such that the flange portion 112 of the intermediate plate can be welded, or otherwise attached, to the rim 72 of the downstream baffle 52. As shown, the cone 96 and the interface portion 98a of the manifold 98 are nested within the opening 92 in the mixer 30. As shown, the opening defines a doser axis D that optionally does not intersect the mixer central axis A (FIG. 5).

As best shown in FIGS. 4A and 5, the wall portion 96g and the cone body are integrally formed together as a single-piece component. An extension transition portion 96f extends (FIG. 6) from an inner surface 130 of the tapered portion of cone 96 at the wide end 96c to the wall 96g. As discussed above the, the wall 96g provides a smooth transition 96h into the mixer itself (FIG. 6) to reduce the risk of urea deposit formation. Further, this configuration provides a simpler assembly that reduces manufacturing time and costs, as well as increasing overall robustness of the mixer.

Figure 6:
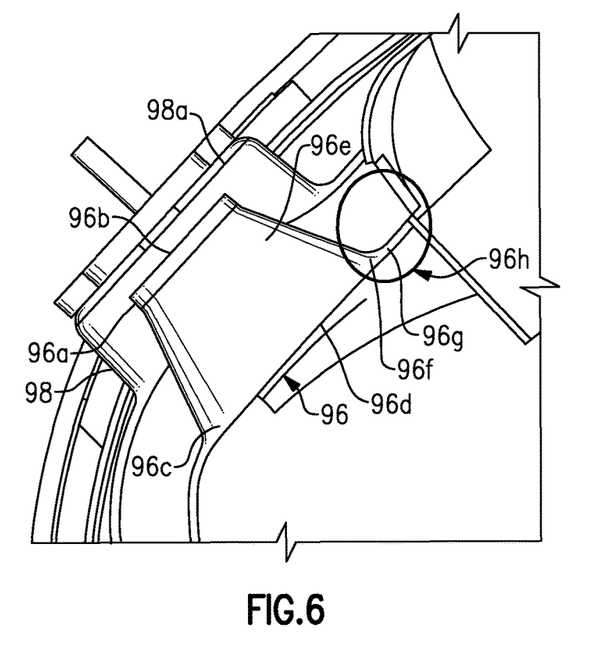
FIG. 6 is a schematic section view of the cone in relation to a mixer inner wall.
Figure 7:
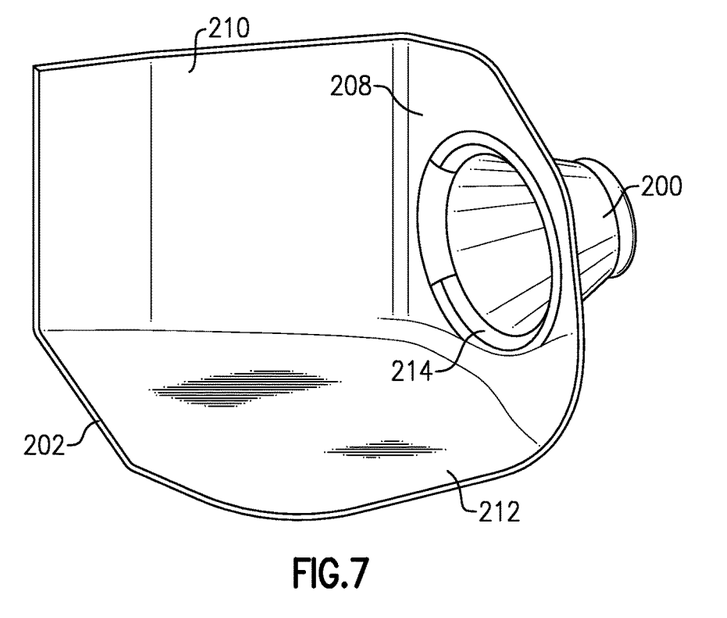
FIG. 7 is a perspective view another example of a cone and extension portion.
Figure 8:
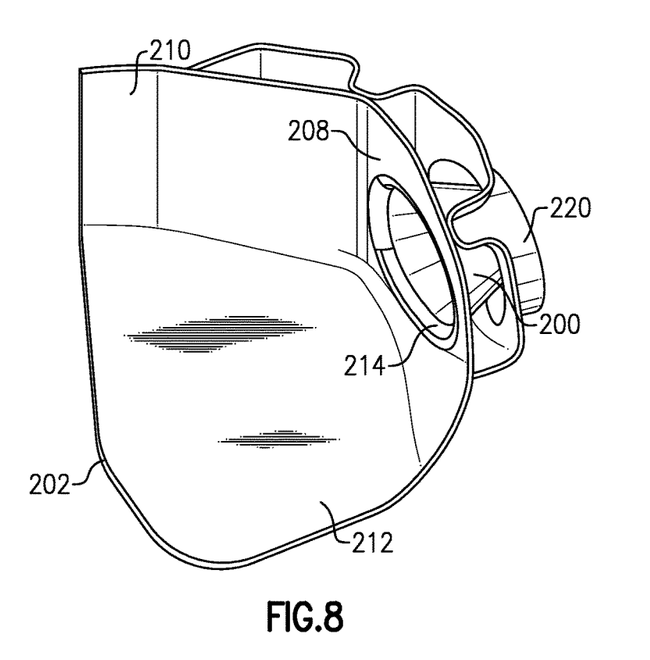
FIG. 8 is a perspective view of the embodiment of FIG. 7 and the manifold.

In the example shown in FIGS. 4-6, the sub-assembly 94 includes the intermediate plate 100 as a separate component that is attached to the cone 96. In another example, embodiment shown in FIGS. 7-9, a cone 200 can be integrally formed with an intermediate plate 202 as a single-piece component. The cone 200 includes an extension portion 214 surrounding an outlet opening that provides a wall 208. This wall 208 then extends integrally into a circumferential wall portion 210 and a base plate portion 212. The wall portion 210 is similar in form to the flange portion 112, and the base plate portion 212 is similar to the wedge-shaped plate portion 104, of the separate intermediate plate shown in FIG. 4A. An extension portion 214 transitions from an inner surface of the cone 200 to the wall 208.

Figure 9:
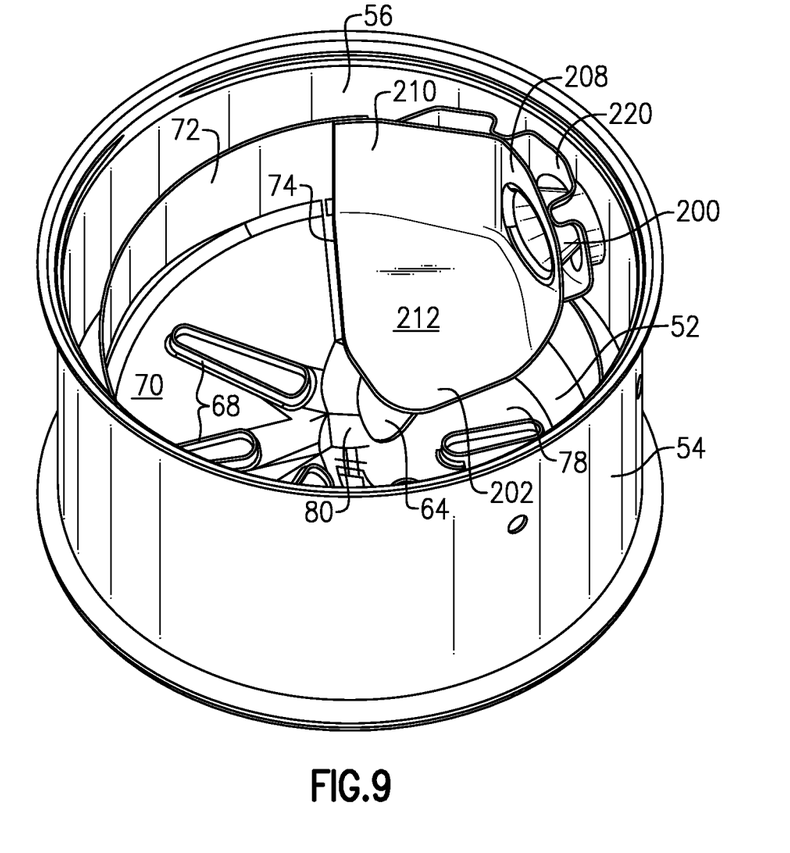
FIG. 9 is a perspective view of the sub-assembly of FIG. 8 included within the mixer.

The cone 200 is attached to a manifold 220 (FIG. 8) that is similar to the manifold 98. This sub-assembly is then installed within the mixer 30 as shown in FIG. 9.

The intermediate plate 100 and plate portion 212 for these example embodiments, are positioned between the upstream 50 and downstream 52 baffles to block direct flow from the primary inlet opening 60 to the primary outlet opening 64. This blockage provides for a rotational flow path that directs exhaust gases exiting the primary inlet opening 60 through a rotation of more than 360 degrees about the mixer central axis A before exiting the primary outlet opening 64. This increased degree of rotation results in more thorough mixing of the reducing agent within the exhaust gas. Also, this more thorough mixing occurs without having to increase the overall axial mixer length according to the axis A direction.

Thus, the subject invention provides a compact mixer 30 that allows at least 360 degrees of flow path in order to increase mixing performance and enhance DEF transformation when a liquid reducing agent is used. Additionally, by providing an integrated doser cone 96, a smooth transition is provided at the interface between the cone outlet and inner mixer wall resulting in reduced deposit formation, which further improves performance. This improved performance is provided without increasing the axial length of the mixer and, further, does not adversely affect back pressure. For example, this 360 to 450 degree rotation flow path is provided within a mixer having an overall length that is 7 to 10 inches long according to the direction defined by axis A.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A reducing agent mixer for use with a vehicle exhaust system, the reducing agent mixer comprising
    a mixer body arranged around a central axis to define an internal space and formed to define an opening that opens into the internal space, the internal space adapted to house mixing of exhaust gas and urea solution when exhaust gas moves along the central axis in a downstream direction through the mixer body,
    a doser configured to discharge the urea solution through the opening of the mixer body into the internal space of the mixer body, and
    a reducing agent delivery sub-assembly including an injection cone that conducts the urea solution discharged from the doser into the internal space of the mixer body and a manifold that includes an interface portion formed to define a cone-receiving cavity that receives a portion of the injection cone and a plurality of attachment arms that define a plurality of inwardly-opening guide channels fluidly connected with one another and the cone-receiving cavity to collect exhaust gas and to direct the exhaust gas into an inlet of the injection cone.

2. The reducing agent mixer of claim 1, wherein the plurality of attachment arms includes a first attachment arm that extends axially upstream away from the interface portion, a second attachment arm that extends circumferentially away from the interface portion, and a third attachment arm that extends circumferentially away from the interface portion opposite the second attachment arm and that turns away from the interface portion to extend axially upstream.

3. The reducing agent mixer of claim 2, wherein the injection cone includes a tapered body that extends between a narrow end and a wide end and an extension wall that extends outward away from the wide end of the injection cone and the extension wall is arranged to close the plurality of inwardly-opening guide channels to define a plurality of guide chambers that are in fluid communication with the internal space.

4. The reducing agent mixer of claim 1, wherein the injection cone includes a tapered body that extends between a narrow end and a wide end and an extension wall that extends outward away from the wide end of the injection cone and the extension wall is arranged to close the plurality of inwardly-opening guide channels to define a plurality of guide chambers that are in fluid communication with the internal space.

5. The reducing agent mixer of claim 4, wherein the plurality of guide chambers includes a first guide chamber formed to define an axially-upstream facing opening and a second guide chamber formed to define a circumferentially facing opening.

6. The reducing agent mixer of claim 5, wherein the plurality of guide chambers further includes a third guide chamber formed to define an axially-upstream facing opening.

7. The reducing agent mixer of claim 4, further comprising an upstream baffle including an upstream helical portion that extends circumferentially about the central axis between an upstream end and a downstream end thereof and an axially extending inlet wall that extends between and interconnects the upstream end and the downstream end of the upstream helical portion and the axially extending inlet wall is formed to include a primary inlet opening arranged to receive the exhaust gas moving into the internal space during use of the reducing agent mixer.

8. The reducing agent mixer of claim 7, wherein the primary inlet opening is radially spaced apart from the central axis.

9. The reducing agent mixer of claim 4, further comprising a downstream baffle including a downstream helical portion that extends circumferentially about the central axis and an axially extending outlet wall formed to include a primary outlet opening.

10. The reducing agent mixer of claim 1, wherein the manifold includes an inner surface and an outer surface spaced apart radially from the inner surface to locate the inner surface radially between the outer surface and the central axis and the inner surface is formed to define the plurality of attachment arms.

11. The reducing agent mixer of claim 1, wherein the injection cone includes a tapered body that extends between a narrow end that defines the inlet of the injection cone and a wide end that defines an outlet of the injection cone, an extension wall that extends outward away from the wide end of the injection cone to surround the outlet, a curved transition portion that extends between the wide end and the extension wall to reduce build-up of the urea solution on the injection cone.

12. A reducing agent mixer for use with a vehicle exhaust system, the reducing agent mixer comprising
a mixer body arranged around a central axis to define an internal space and formed to define an opening that opens into the internal space,
a doser configured to discharge reducing agent through the opening of the mixer body into the internal space of the mixer body, and
a reducing agent delivery sub-assembly including an injection cone and a manifold, the injection cone having a tapered body that extends between a narrow end and a wide end thereof and an extension wall that extends outward away from the wide end, the manifold includes an interface portion formed to define a cone-receiving cavity that receives the narrow end of the injection cone and a plurality of attachment arms coupled to the interface portion, the attachment arms formed to define a plurality of guide channels fluidly connected with the cone-receiving cavity, and the extension wall of the injection cone cooperates with the attachment arms to close the plurality of guide channels to define a plurality of guide chambers.

13. The reducing agent mixer of claim 12, wherein the guide chambers are in fluid communication with the internal space.

14. The reducing agent mixer of claim 13, wherein the plurality of guide chambers includes a first guide chamber formed to define an axially-upstream facing opening and a second guide chamber formed to define a circumferentially facing opening.

15. The reducing agent mixer of claim 14, wherein the plurality of guide chambers further includes a third guide chamber formed to define an axially-upstream facing opening.

16. The reducing agent mixer of claim 12, wherein the plurality of attachment arms includes a first attachment arm that extends axially upstream away from the interface portion and a second attachment arm that extends circumferentially away from the interface portion.

17. The reducing agent mixer of claim 16, wherein the plurality of attachment arms further includes a third attachment arm that extends circumferentially away from the interface portion opposite the second attachment arm and turns away from the interface portion to extend axially upstream.

18. The reducing agent mixer of claim 16, wherein the injection cone further includes a curved transition portion that extends between the wide end and the extension wall to reduce build-up of reducing agent on the injection cone.

19. The reducing agent mixer of claim 12, further comprising an upstream baffle including an upstream helical portion that extends circumferentially about the central axis between an upstream end and a downstream end thereof and an axially extending inlet wall that extends between and interconnects the upstream end and the downstream end of the upstream helical portion and the axially extending inlet wall is formed to include a primary inlet opening.

20. The reducing agent mixer of claim 19, further comprising a downstream baffle including a downstream helical portion that extends circumferentially about the central axis.

* * * * *